United States Patent [19]

Nee

[11] Patent Number: 5,306,349
[45] Date of Patent: Apr. 26, 1994

[54] METHOD FOR REMOVING COATINGS FROM COMPACT DISCS

[75] Inventor: Han H. Nee, Shizouka, Japan

[73] Assignee: Sony Music Entertainment, Inc., New York, N.Y.

[21] Appl. No.: 980,582

[22] Filed: Nov. 23, 1992

[51] Int. Cl.⁵ .................................................. B08B 3/12
[52] U.S. Cl. .......................................... 134/1; 134/2; 134/29; 134/33; 134/38
[58] Field of Search ....................... 134/1, 2, 3, 10, 26, 134/29, 32, 33, 38; 252/156, 525, 526, 535, 544, 545, DIG. 11

[56] References Cited

U.S. PATENT DOCUMENTS

| | | | |
|---|---|---|---|
| 2,850,411 | 9/1958 | Bratring | 134/29 |
| 3,158,886 | 12/1964 | Grimes | 134/1 |
| 3,335,966 | 8/1967 | Haveman | 241/14 |
| 3,516,841 | 6/1970 | Haveman | 106/193 |
| 3,849,196 | 11/1974 | Halloway et al. | 134/1 |
| 3,853,622 | 12/1974 | Rutten | 134/25.4 |
| 3,877,474 | 4/1975 | Urssing et al. | 134/6 |
| 4,212,774 | 7/1980 | Idel | 521/40 |
| 4,368,274 | 1/1983 | Scott | 521/48 |
| 4,434,069 | 2/1984 | Fairchild | 134/29 |
| 4,439,289 | 3/1984 | Viglione | 134/38 |
| 4,477,290 | 10/1984 | Carroll et al. | 134/2 X |
| 4,505,836 | 3/1985 | Fairchild | 252/174.14 |
| 4,799,954 | 1/1989 | Hochberg | 134/28 X |
| 4,974,616 | 12/1990 | Lee | 134/1 |
| 5,015,302 | 5/1991 | Henig | 134/33 |
| 5,127,958 | 7/1992 | Personette | 134/29 |

Primary Examiner—R. Bruce Breneman
Assistant Examiner—Saeed T. Chaudhry
Attorney, Agent, or Firm—Rosenman & Colin

[57] ABSTRACT

A method for removing the lacquer and aluminum coatings from the polycarbonate substrate of scrap compact discs so as to reclaim the polycarbonate includes the steps of immersing the discs in a an alkaline solution, heating the solution to a predetermined temperature and mechanically agitating the immersed discs by applying ultrasonic energy to the solution at a sufficient energy density and for a sufficient time to dissolve the lacquer and the aluminum into the solution. The solution containing the dissolved lacquer and aluminum is decanted from the stripped polycarbonate discs, the discs are washed with water to remove remanent alkaline solution, and then dried.

10 Claims, No Drawings

METHOD FOR REMOVING COATINGS FROM COMPACT DISCS

BACKGROUND OF THE INVENTION

This invention relates to the treatment of compact discs to remove the coatings normally applied to its polycarbonate substrate during manufacturing, and more particularly has to do with a method for the removal of such coatings in order to reclaim the polycarbonate.

As is well known, the compact disc is becoming an increasingly popular medium for the replication of audio programs. As currently manufactured, the compact disc comprises a thin circular polycarbonate substrate approximately 4¾ inches in diameter and having a central aperture adapted to be received on the centering mechanism of a disc player. Usually, the disc incorporates digitally encoded information on one surface thereof which is adapted to be laser-read by the disc player. The information-bearing surface of the substrate is coated with a thin film of aluminum which, in turn, is covered with a protective lacquer coating, of which two types are currently in common use. One is a cellulose nitrate based material in a suitable solvent such as toluene (so-called solvent based lacquer), and the other is an ultra-violet cured acrylic based material. Information regarding the programs recorded on the disc is printed in ink on the lacquer coating.

In the course of manufacture and distribution of such compact discs, many are scrapped as production rejects, or as a consequence of returns and inventory obsolescence, which presents a serious problem of disposal. Currently, they are either sold for scrap polycarbonate at a price which is very low (currently about $.01 per pound) because of contamination by the coatings or, if not salable at any price, discarded in a landfill. If the coatings are removed, the polycarbonate is more salable in that it can be re-used for the fabrication of compact discs or other parts and fetches a reasonable price, currently $.24 per pound, which at the same time, eliminates the need to landfill the scrapped discs.

The primary object of the present invention is to provide a process for removing the coatings from the polycarbonate substrate of compact discs so as to reclaim the polycarbonate.

Another object of the invention is to provide a process for treating compact discs to remove the coatings from its polycarbonate substrate that will free the protective lacquer coating regardless of its type.

SUMMARY OF THE INVENTION

Briefly, the process according to the invention for the treatment of compact discs to remove the coatings therefrom to free the polycarbonate substrate comprises the steps of mechanically agitating the discs with ultrasonic energy while they are immersed in a heated alkaline solution until the coatings are stripped from the substrate, and then rinsing and drying the stripped polycarbonate discs.

DETAILED DESCRIPTION OF THE INVENTION

Applicant has found, surprisingly, that it is possible to strip the protective lacquer layer, whether UV cured or solvent-based, and the underlying aluminum film, from the polycarbonate substrate of compact discs, without causing dissolution of the polycarbonate, by placing a quantity of the discs in a perforated barrel supported for rotation in an ultrasonic tank containing an aqueous alkaline solution of an alkaline salt or a base, a chelating additive and a surfactant, and as the barrel is rotated agitating the discs with ultrasonic energy for a time sufficient to completely remove the coatings from the substrate. The long axis of rotation of the barrel is disposed horizontally, and the barrel, which typically may be sixteen inches in diameter and twenty inches long, has round openings or holes, three to four inches in diameter, in its walls to facilitate flow of the solution to and from the interior of the barrel and floating of removed flakes of lacquer out of the barrel for settling onto the bottom of the tank. Any desired number of discs, up to the capacity of the barrel, are loaded into the barrel.

The tank in which the barrel is supported is filled with an aqueous alkaline solution containing: (1) an alkaline salt or a base which preferably is a mixture of alkali metal phosphate, alkali metal hydroxide and alkali metal carbonate, wherein the metal may be either sodium or potassium; (2) a chelating additive selected from the alkali metal salts of citric acid, ethylenediamine tetraacetic acid (EDTA), gluconic acid and nitrilotriacetic acid, and (3) a wetting agent selected from the group including sodium alkylbenzene sulfonate, napthalene sulfonate, fatty acid esters and sodium lauryl sulfate. Following is a working alkaline composition range for the three basic constituents:

alkaline salt or a base—30 to 500 gm/liter;
chelating additive—0.5 to 100 gm/liter;
and wetting agent—0.5 to 10 gm/liter.

The preferred composition range is: alkaline salt—50 to 200 gm/liter; chelating additive—5 to 50 gm/liter, and wetting agent—1 to 5 gm/liter.

The alkaline solution is heated to a temperature in the range from about 130° F. to about 220° F., and the barrel is rotated about its horizontal axis at a speed preferably in the range from 60 revolutions per minute to 100 revolutions per minute, so as to cause significant turbulence in the solution passing over the discs contained in the barrel. At the same time, the barrel is oscillated in the vertical direction at about one cycle/second with a displacement of about six inches, for additionally agitating the contained discs. The advantageous results of the process of stripping the lacquer coating are achieved in large part by applying to the alkaline solution ultrasonic energy at a frequency in the range from about 20 kHz to about 40 kHz at a power level consistent with the amount of material in the barrel; typically the power level may be in the range from about 10 to about 200 watts per liter of solution contained in the tank. It has been determined that barrel rotation speeds as low as 10 rpm can be used, and that the faster the speed of rotation the faster the rate at which the coatings are stripped from the substrate. Within the operational limits of the supporting structure and mechanism for rotating the barrel, acceptable results are obtainable at rotational speeds in the range from about 10 rpm to about 200 rpm, a range of about 60-100 rpm being preferred for a barrel of the size indicated. The barrel is rotated and agitated for a time sufficient to flake off or dissolve the lacquer and dissolve into the solution the aluminum coatings from all discs of the batch which may take from about 1½ to 2 hours for a fully loaded barrel of the size indicated immersed in an alkaline solution at a concentration and a temperature within the ranges indicated. The time required will vary with the frequency and power level of the ultrasonic energy, the speed of rotation of the barrel and other parameters such as solution concentration and temperature.

The process according to the invention will remove both of the lacquers commonly used today in manufacturing compacts discs; accordingly, if a batch of discs loaded into the barrel happens to be a mixture of some having UV cured lacquer coating and others having a solvent based lacquer coating, both kinds will be dissolved at the same time without any adjustment in the process.

After the coatings have been stripped from all discs of the batch contained in the barrel, the alkaline solution along with the flaked and/or dissolved lacquer and dissolved aluminum is decanted from the barrel, leaving behind the stripped polycarbonate discs. The stripped discs are then washed with water, preferably at a temperature in the range from about 100° F. to about 210° F., to remove remanent caustic solution from the discs. Following washing, the discs are dried in a suitable hot air dryer, such as the Hot Air Dryer manufactured and sold by Branson Ultrasonic Corporation, Danbury Connecticut, at a temperature in the range from about 100° F. to about 210° F. The time required for rinsing and drying a barrel of discs is about fifteen minutes.

EXAMPLE 1

Compact discs having a protective lacquer coating over an aluminum coating, were placed in a barrel having a volume of 2 liters which was rotated at 60 rpm in a tank containing 20 liters of an aqueous solution of sodium hydroxide, sodium phosphate and sodium carbonate at concentrations of 100 gm/liter, 50 gm/liter and 25 gm/liter, respectively, sodium lauryl sulfate at a concentration sufficient to keep the surface tension of the solution in a range from 40 to 50 dynes/cm, typically 1 gm/liter, the solution was heated to a temperature of 180° and subjected to one kilowatt of ultrasonic energy at a frequency of 20 kHz. The lacquer coating was stripped, and the aluminum coating dissolved, in about one hour.

EXAMPLE 2

A batch of scrap compact discs was placed in a barrel having a volume of 15 liters which was immersed and rotated at 60 rpm in a tank containing 100 liters of an aqueous solution of sodium hydroxide, sodium carbonate, sodium tripoly phosphate and sodium lauryl phosphate at concentrations of 100 gm/liter, 50 gm/liter, 25 gm/liter and 1-5 gm/liter, respectively, the solution was heated to a temperature of 160° and subjected to 4 kilowatts of ultrasonic energy at a frequency of 20 kHz. The lacquer coating was stripped and the aluminum coating dissolved, in about 1½ hours. Similar results were observed when potassium hydroxide was used as the alkaline salt instead of sodium hydroxide.

EXAMPLE 3

A batch of scrap compact discs was placed in a barrel having a volume of 20 liters which was immersed and rotated at 30 rpm in a tank containing 125 liters of an aqueous solution of potassium hydroxide, sodium carbonate, tetrasodium phosphate, EDTA and naphthalene sulfonate at concentrations of 50 gm/liter, 50 gm/liter, 50 gm/liter, 5 gm/liter and 5 gm/liter, respectively, the solution was heated to 160° F. and subjected to 8 kilowatts of ultrasonic energy at 40 kHz. The lacquer coating was stripped and the aluminum coating dissolved in about 2 hours.

While several alkaline solutions having different compositions have been described, and preferred ranges of concentrations of each constituent indicated, the process will work with any alkaline solution having a pH of about 13 and above. For practical purposes, the chemicals used and their concentrations should be such that the reaction between the alkaline solution and the lacquer and the aluminum proceeds at a rate deemed desirable by the practitioner of the method. Similarly, the speed of rotation of the barrel, the temperature to which the solution is heated, and the amount and frequency of the applied ultrasonic energy are such that the combined chemical reaction and mechanical agitation causes the stripping action to proceed at a rate deemed desirable by the practitioner.

What is claimed is:

1. A method for removing the lacquer and aluminum coatings from the polycarbonate substrate or a compact disc, comprising the steps of:
   (a) immersing a batch of compact discs comprising compact discs coated with a solvent based lacquer coating and/or compact discs coated with a UV-cured acrylic lacquer coating in an alkaline solution at a pH of about 13 or more;
   (b) heating said alkaline solution;
   (c) mechanically agitating said immersed discs by applying to said heated alkaline solution ultrasonic energy having a frequency in the range from about 20 to about 40 Khz with an energy density in the range from about 10 to about 200 watts per liter, the alkaline solution being at a sufficient concentration and temperature and in contact with the agitated discs for a time sufficient to dissolve the lacquer and aluminum coatings into solution and to leave behind stripped polycarbonate discs;
   (d) washing the stripped polycarbonate discs to remove remanent alkaline solution therefrom; and
   (e) drying the washed polycarbonate discs.

2. A method as defined in claim 1, wherein said alkaline solution is contained in a tank, wherein said batch of discs is contained in a rotatable perforate barrel which is immersed in the alkaline solution, and wherein said barrel is rotated at a speed in the range from about 10 rpm to about 200 rpm.

3. A method as defined in claim 2, wherein said barrel is rotated at a speed in the range from about 60 rpm to about 100 rpm.

4. A method as defined in claim 1, wherein said alkaline solution is an aqueous solution of an alkaline salt or a base, a chelating additive and a wetting agent.

5. A method as defined in claim 1, wherein said alkaline solution is an aqueous solution of:
   a member selected from the group consisting of alkali metal phosphate, alkali metal hydroxide and alkali metal carbonate wherein the metal is selected from the group consisting of sodium and potassium;
   a chelating additive selected from the alkali metal salts of citric acid, ethylenediamine tetraacetic acid (EDTA), gluconic acid and nitrilotriacetic acid; and
   a wetting agent selected from the group consisting of sodium alkylbenzene sulfonate, naphthalene sulfonate, fatty acid esters and sodium lauryl sulfate.

6. A method as defined in claim 5, wherein said alkaline solution said member has a concentration in the range from about 30 to about 500 gm/liter, said chelating additive has a concentration in the range from about 0.5 to about 100 gm/liter and said wetting agent has a concentration in the range from about 0.5 to about 10 gm/liter.

7. A method as defined in claim 5, wherein in said alkaline solution said member has a concentration in the range from 60 to 200 gm/liter, said chelating additive has a concentration in the range from 5 to 50 gm/liter and said wetting agent has a concentration in the range from 1.0 to 5 gm/liter.

8. A method as defined in claim 7, wherein said alkaline solution is contained in an ultrasonic tank, wherein said batch of discs is placed in a perforate cylindrical barrel which is immersed in the alkaline solution and is rotated in said solution at a speed in the range from 60 to 100 rpm.

9. A method as defined in claim 8, wherein the stripped polycarbonate discs are washed in water having a temperature in the range from 100° to 210° F., and wherein the washed polycarbonate discs are air dried at a temperature in the range from 100° to 210° F.

10. A method as defined in claim 5, wherein said alkaline solution is contained in a tank, wherein said batch of discs is contained in a perforate cylindrical tank which is immersed and rotated in said alkaline solution at a speed in the range from about 60 to 100 rpm.

* * * * *